R. R. HUGHES, Jr.
TRIPLE SEAM SEWING MACHINE.
APPLICATION FILED APR. 15, 1912.

1,075,422.

Patented Oct. 14, 1913.
5 SHEETS—SHEET 1.

WITNESSES:
Edward L. Russell.
F. E. Boyce

INVENTOR
Robert R. Hughes, Jr.
BY
ATTORNEY

R. R. HUGHES, Jr.
TRIPLE SEAM SEWING MACHINE.
APPLICATION FILED APR. 15, 1912.

1,075,422.

Patented Oct. 14, 1913.
5 SHEETS—SHEET 2.

WITNESSES:
Edward L. Russell
F. E. Boyce

INVENTOR
ROBERT R. HUGHES, Jr
BY 
ATTORNEY

R. R. HUGHES, Jr.
TRIPLE SEAM SEWING MACHINE.
APPLICATION FILED APR. 15, 1912.

1,075,422.

Patented Oct. 14, 1913.
5 SHEETS—SHEET 5.

WITNESSES:
Edward L. Russell.
F. E. Boyce.

INVENTOR
ROBERT R. HUGHES, JR.
BY 
ATTORNEY

UNITED STATES PATENT OFFICE.

ROBERT R. HUGHES, JR., OF NYACK, NEW YORK, ASSIGNOR TO LUCIUS N. LITTAUER, OF GLOVERSVILLE, NEW YORK.

TRIPLE-SEAM-SEWING MACHINE.

1,075,422.   Specification of Letters Patent.   Patented Oct. 14, 1913.

Application filed April 15, 1912. Serial No. 690,803.

*To all whom it may concern:*

Be it known that I, ROBERT R. HUGHES, Jr., a citizen of the United States, residing at Nyack, in the county of Rockland and State of New York, have invented certain new and useful Improvements in Triple-Seam-Sewing Machines, of which the following is a specification.

This invention relates to sewing machines, and more particularly to improved means for making a triple seam, the object of the invention being to provide means for trimming simultaneously the edges of several pieces or plies of work and folding the same, and then infolding such edges thereby to provide a triple seam made up of six plies of material, and to do this expeditiously and by a comparatively simple mechanism readily accessible to the operator and one which is not liable to get out of order.

In working up material of various colors it is frequently very difficult, if not at times impossible, to obtain a binding which will properly or exactly match the color of the goods, but by means of the present improvement the necessity of binding the edge is entirely avoided, while the cost of production is decreased.

I am aware that it is not new to fold one edge of a piece of material for the purpose of sewing it to the raw edge of another piece thereof, or even to fold both edges of such pieces for the purpose of sewing them together, but in none of those machines with which I am familiar are two or more plies of material first folded together and then the raw edges of both plies simultaneously infolded, whereby there is obtained a felled or triple seam.

Therefore it is the object of the present improvement not only to provide mechanism which will produce a seam of the character described, but to provide means—all coöperating in such manner that the work to be done thereby will be efficiently performed, and furthermore, to provide a mechanism in which all of the operating parts will be located in front of the needle and to also provide a mechanism in which the several parts will coöperate with the presser foot, and in which also the several parts will so coöperate that the necessity of feeding one layer or ply of material spaced apart from another layer or ply of material is avoided, so that the several layers of material may be fed under the presser foot in the usual manner, that is one on top of and in engagement with another, whereby the proper feeding of the several layers of material will simultaneously take place.

In the drawings accompanying and forming part of this specification, Fig. 4 is a cross-sectional view taken in line 4—4, Fig. 1, and looking toward the left.

Similar characters of reference indicate corresponding parts throughout the figures of the drawings.

In the present improvement the several plies of material, two or more, two being shown herein, are first fed under the presser foot, whereupon the edges thereof are trimmed and such trimmed edges are then folded together and the so folded edges then pushed into position for the action of the infolder, which then engages the same and infolds the trimmed edges upon themselves, at the same time assisting in feeding the folded material toward the needle, whereupon the needle penetrates the triple fold, thus providing a triple seam and making it unnecessary to bind the same with an independent binding.

Figures 14, 15, 16:
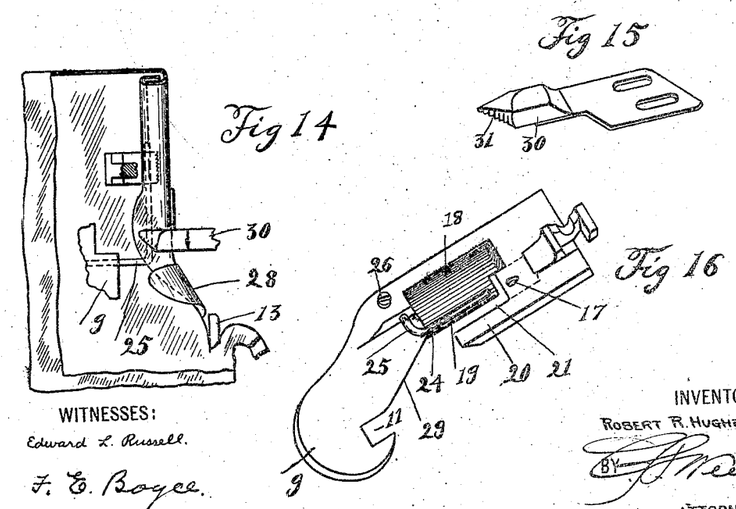
Fig. 14 is a top view illustrating the manner in which the material is cut and first folded for the action of the infolder, the said view illustrating some of the parts coöperating with the presser foot.
Fig. 15 is a detail view of the means hereinafter designated as the shover or pusher for pushing the material into position for the action of the infolder.
Fig. 16 is a perspective view of the presser foot.

In the present embodiment of the improvement so much of a sewing machine only is shown as is necessary to illustrate this improvement, and this comprises the usual base portion 2 including a cloth or bed plate 3, the usual driving mechanism, an overhanging arm or gooseneck 5, a part only of which is shown, terminating in a head 5', a needle actuating lever 6, a part only of which is shown, pivoted to the overhanging arm for reciprocating the needle bar 7 in the usual manner, and a presser foot bar 8 supported in the usual manner for carrying at its lower end a detachable presser foot 9, which in the present instance is somewhat differently constructed from the ordinary presser foot and the construction of which is more clearly illustrated in Fig. 16. Located under this presser foot are the usual feed dogs 10 for feeding the material to the needle.

Figure 2:
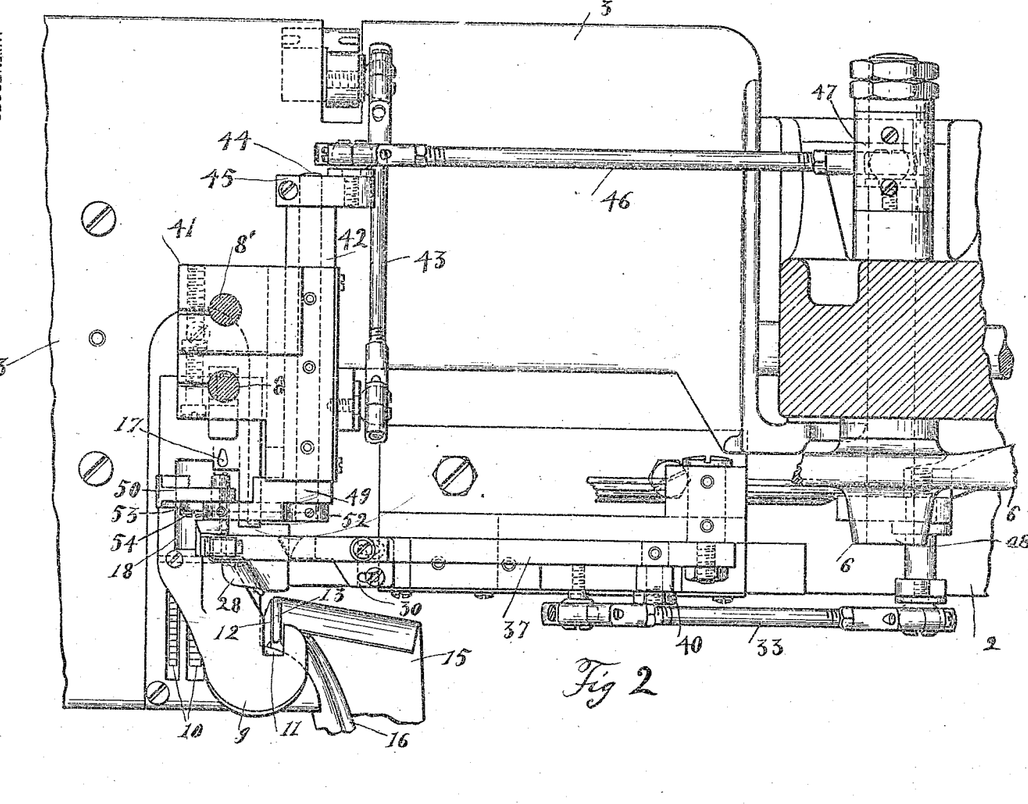
Fig. 2 is a plan, partly sectional, view of the present improvement.

The forward or projecting front portion of the presser foot 9 is recessed, as at 11, and in this recess is located the fixed blade 12 and the movable blade 13 of the trimming mechanism, the movable blade being reciprocated up and down by suitable connecting means operated from the main driving shaft, and as this trimming mechanism, other than its peculiar coöperation and location, does not differ from similar forms of trimming mechanism heretofore described and illustrated for instance in a patent of John P. Weis, No. 1,016,590, dated February 6th, 1912, with which I am familiar, a further description thereof is not believed to be necessary. The movable blade 13, however, is provided with a guide or shield 15, (see Fig. 2), for directing the material away from the knives, and this guide or shield extends along the arm 16 carrying the movable blade and is curved upwardly and over and extends laterally away from such movable blade.

Figure 1:
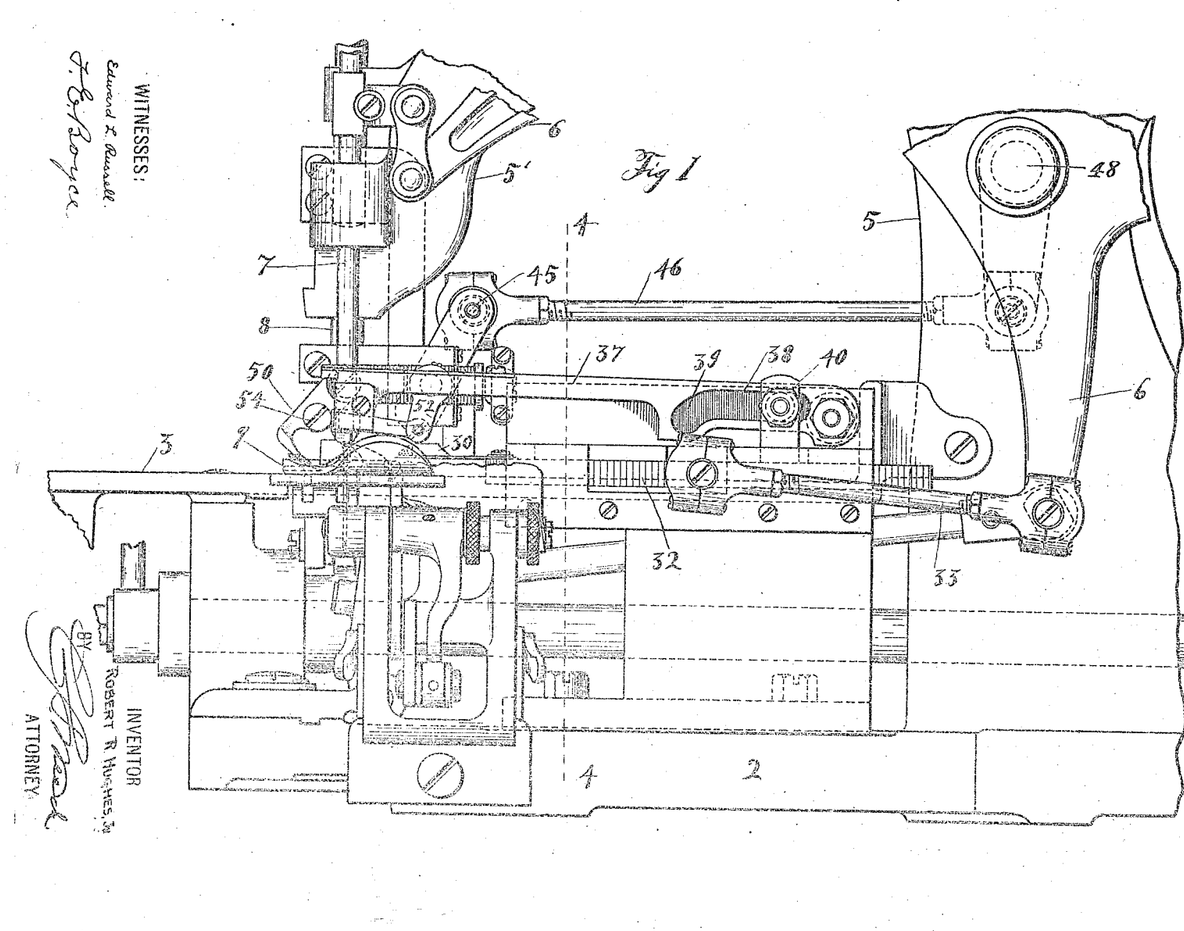
Figure 1 is a front view of a portion of a sewing machine illustrating the present improvement applied thereto.
Figures 1, 5, 6, 7:
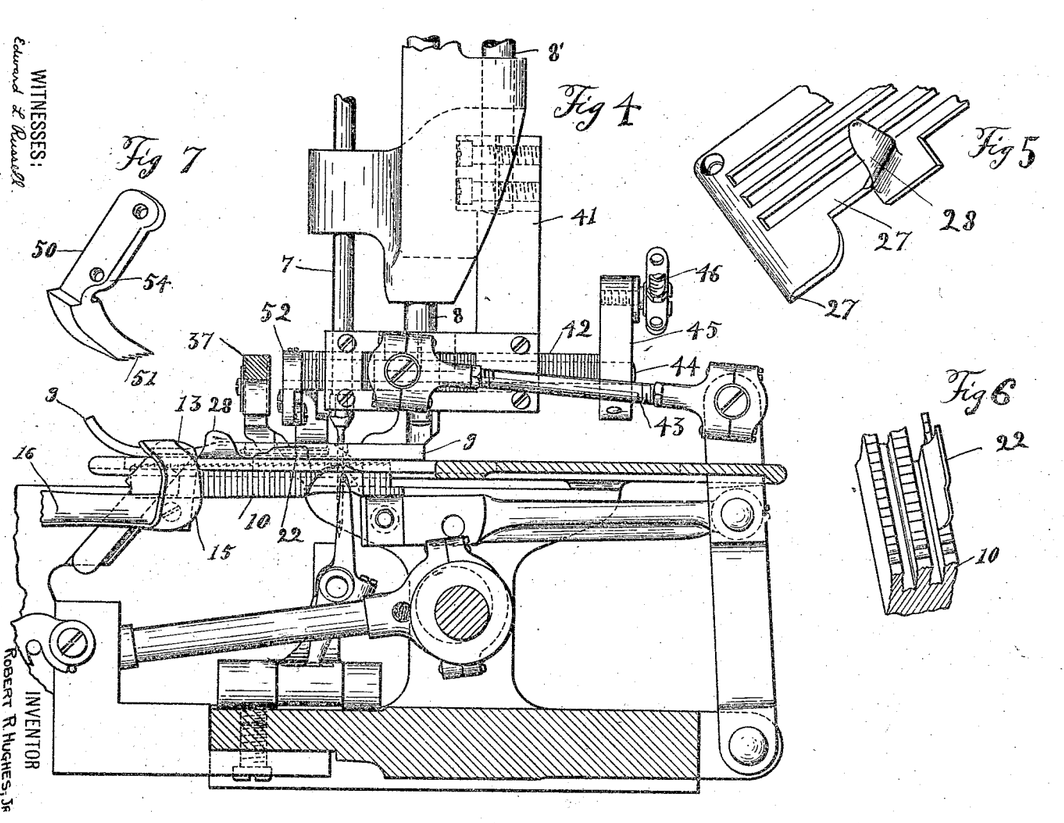
Fig. 5 is a partly detail view of the throat plate.
Fig. 6 is a partly detail view of the feed dogs.
Fig. 7 is a perspective view of the infolder.

The main presser foot 9 is provided with an opening 17 for the passage of the needle, and in front thereof is formed with a depression or chamber 18, and between the inner edge 19 of which chamber and a projecting portion 20 of such presser foot is formed a space 21 for the reception of a curved projection 22, (see Fig. 6), carried by the feed dog 23. Extending along the inner edge of this concave chamber 18 of the presser foot is a guide member in the form of a wire 24, one end of which is bent, as at 25, to project into an opening in the presser foot, it being secured therein by a screw 26.

Figure 8:
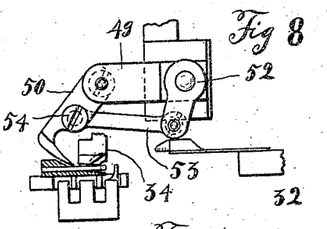
Figs. 8 and 9 are detail views illustrating the operation of such infolder and the parts coöperating therewith.
Figure 10:
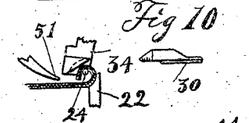
Figure 12:
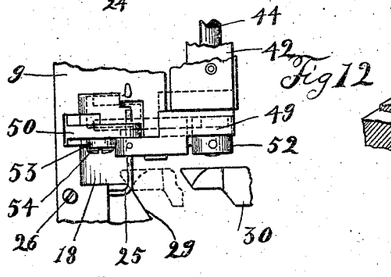
Fig. 12 is a detail top view of a part of the mechanism shown in Figs. 8 and 9.

Carried by the throat plate 27, (see Fig. 5), is a projection 28 extending upwardly and over the inclined edge 29 of the presser foot, which projection 28 gives the first fold to the trimmed edges of the material, as shown in Fig. 14, the subsequent infolding of the material being obtained by the infolder which presses the material under the wire 24 hereinbefore referred to. As the material is fed under the presser foot the edges thereof are first trimmed. Immediately thereafter the trimmed material is fed forward by the feed mechanism and the so trimmed edges folded over the inclined edge 29 of the presser foot in the manner shown in Fig. 14 by the folding device 28 carried by the throat plate. Thus it will be observed that by the coöperation of the inclined edge of the presser foot and the overhanging projection 28 the first fold is given to the material. Subsequent to this fold the folded edge is engaged by a shover or pusher 30, (see Figs. 14 and 15), which is serrated on its forward underside, as at 31, and this implement, which is of resilient form, pushes the material transversely of the presser foot so as to give an increased amount of material for the subsequent fold or infold. This pusher is, in the present embodiment, moved back and forth by the needle actuating lever and it may have a downward movement at the proper time to accomplish the result set forth. This pusher is adjustably carried by a bar 32 suitably supported at the front of the machine and connected to the needle actuating lever 6 by an adjustable rod 33. As the pusher leaves the material a supplemental presser foot or clamp 34, (see Fig. 13), is brought into engagement with the material to hold it in the position in which it has been left by the pusher. This supplemental presser foot or clamp comprises a channel-shaped member 35 supported at the end farthest from the needle by a depending arm 36 detachably secured to the forward end of a pivotally supported arm or bar 37. The rear end of this bar is pivotally secured to the same support which carries the pusher, and this bar is provided with an elongated slot 38, (see Fig. 1), having a depending portion 39. In this slot a roll moves back and forth, this roll being carried by an upwardly extending projection 40 secured to the pusher bar 32, so that as the pusher bar is reciprocated the roll will move in the slot 38 and by means of the curved end 39 thereof will raise and lower, that is reciprocate, the supplemental clamp or presser foot, the channel portion of which is located in the depression or chamber 18 of the presser foot so as to lie over the wire 24 thereof in the manner shown in Figs. 8 and 10. As this supplemental presser foot or clamp is raised at the proper time the material is fed by the feeding mechanism under the channel-shaped guide or portion 34 of such clamp. As the material is fed under this channel-shaped portion of the supplemental clamp the supplemental folder, or infolder as it is herein termed, is brought into action to engage the material and infold it, thus giving the several plies of material a second fold and so forming a triple seam for the stitching thereof as it passes to the needle. In the present improvement this infolder also moves with the material, thereby to assist in pushing it toward the needle, so that it acts both as a folder and to assist in the feeding of the folded material. This infolder is supported for swinging movement and for reciprocating movement toward and from the needle and for movement in a vertical plane, a part of its movement in the present instance being obtained from the needle actuating lever and a part from the feed mechanism.

Figure 3:
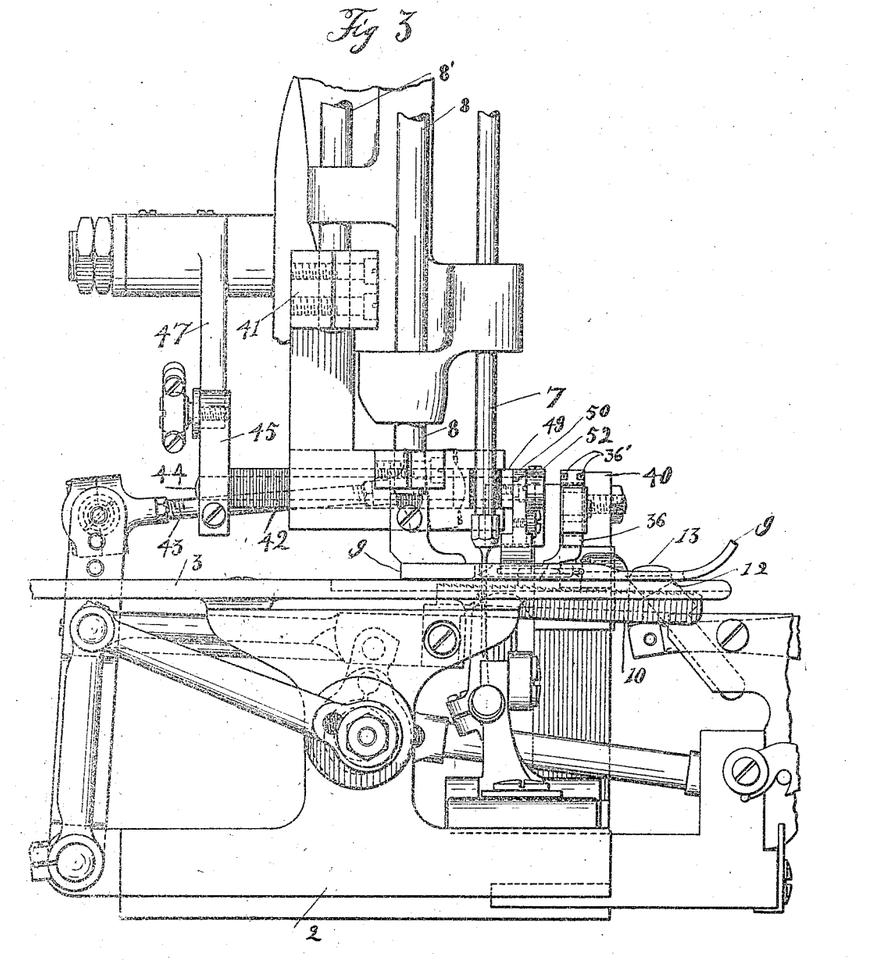
Fig. 3 is an end view of so much of the machine as is shown in Fig. 1, looking from left to right.

Secured to the presser foot bar 8 and to a guide bar 8' located in the rear thereof, and which guide bars are supported for sliding movement in the head of the overhanging arm or goose-neck, is a suitable support or block 41. This block, which is movable up and down with the main presser foot, supports a slide 42, which slide is reciprocated by an adjustable rod 43, one end of which is connected to the slide and the other end to a part of the feed dog operating mechanism, (see Fig. 4). Located in this slide 42 is a rock shaft 44, and to the rear end of this shaft is secured a crank arm 45 connected by an adjustable rod 46 with another crank arm 47 secured to a stud 48 projecting through the gooseneck and secured to the needle actuating lever 6, (see Figs. 1 and 3). Thus it will be apparent that as the needle actuating lever is rocked by the usual driving mechanism the shaft 44 is also rocked or oscillated, and at the same time, by means of the feed operating mechanism, the sliding block and the shaft are reciprocated back and forth, and it will also be apparent that the shaft and its block are raised and lowered as the presser foot moves up and down during the operation of the machine.

On the front end of the slide carrying the shaft 44, and formed as a part thereof or secured thereto, is a projection 49, the forward end of which pivotally supports a swinging feed foot or infolder 50, (see Figs. 1 and 7), having a serrated portion 51 at its lower end. Secured to the front end of the shaft 44 is a crank arm 52, the lower end of which is connected by a link 53 with the infolder at 54, (see Figs. 1 and 7). Thus, by the mechanism shown and described the infolder is given a swinging movement, a rising and falling movement and a movement toward and from the needle, so that the infolder will engage the material and form a second fold and move with the material toward the needle, thereupon releasing such material, moving away from the material and away from the needle back to its initial position. The organization is such that this improved mechanism will accommodate itself to various thicknesses of material and is capable of handling one or more plies of material irrespective of its thickness within the limits of the adjustment.

Figures 9, 11:
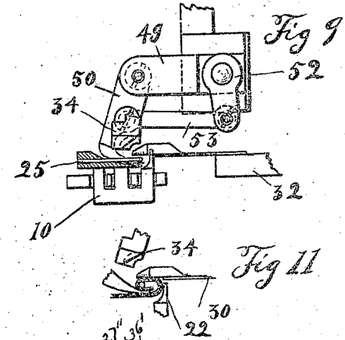
Figs. 10 and 11 illustrate the manner in which the folded edges of the several plies of material are infolded by the infolder shown in Figs. 8 and 9.

The rising and falling movement of the infolder is, of course, due to the rising and falling movement of the block carrying the same, which is clamped to the presser foot, and as the presser foot is raised by the feed dogs thereunder it raises the block, the presser foot being returned to its engagement with the material on the throat plate by a suitable spring, not shown. As the infolder is swung to the right to engage the first folded edges it carries the material, which has been pushed forward by the pusher, under the wire of the presser foot, (see Figs. 10, 11 and 14), the serrations of such infolder engaging and forcing the material under such wire located within the channel 35 of the supplemental clamp, and the serrated end of the infolder coöperates with the part 22 of the feed dog, (see Fig. 6), so that there will be no slippage of the material and avoiding the possibility of skipping any threads during the stitching operation. In other words, the movement of the infolder toward the needle and of the part 22 carried by the feed dog toward the needle takes place substantially simultaneously, and during this movement the material is thus effectively held by the infolder and the part 22 so that it will be properly stitched and no opportunity for the slipping of the material or the skipping of any threads afforded.

Figure 13:
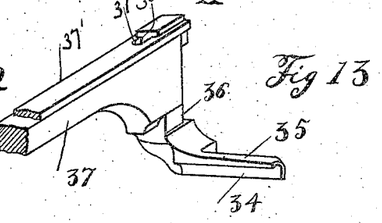
Fig. 13 is a detail view of the supplemental presser foot or clamp.

As hereinbefore stated, the supplemental clamp 34 is detachably secured to the arm 37, and in the present embodiment this is obtained by bifurcating the end of the arm 37 to receive the supporting or depending arm 36 of the supplemental clamping foot 34, (see Fig. 13). Carried by the arm 37 is a leaf spring 37', which is also bifurcated, as at 37'', to conform to the forked end of the arm 37, and the forked ends of the leaf spring 37' fit into grooves or channels 36' formed in the upper end of the arm 36, thus permitting the foot to have an independent yielding pressure and so adjust itself to the various thicknesses of work which may be folded, thus avoiding any pounding action of the supplemental presser foot or clamp on the top of the main presser foot or upon the wire fold guide 24.

I have used the term "triple seam" herein because the needle penetrates at least three folds of the material, passing through six plies thereof if two pieces of material are folded and through three plies if a single piece of material only be used.

I claim as my invention:

1. In a sewing machine the combination of means for folding in one direction the edge of a piece of work lengthwise and automatically movable means independent of said first means for folding the said folded edge in the opposite direction also lengthwise.

2. In a sewing machine, the combination of means for folding together in juxtaposition the edges of several plies of material and independent and automatically operative means for infolding the so folded edges and comprising means movable transversely of the line of travel of the material.

3. In a sewing machine, the combination of means for folding the edge of the work and means for infolding such folded edge and comprising means movable transversely of the line of travel of the work and also movable with the work, and means for imparting thereto such movements.

4. In a sewing machine, the combination of means for folding the edge of the work and means for infolding such folded edge lengthwise of the previously folded edge and comprising a movable foot, and means for automatically reciprocating said foot in the direction of the travel of the work toward and from the needle.

5. In a sewing machine, the combination of means for folding the edge of the work lengthwise and means for infolding such folded edge lengthwise and comprising a movable foot, means for reciprocating said foot toward and from the needle, and means for shifting said foot transversely of its plane of reciprocatory movement.

6. In a sewing machine, the combination of means for folding together in juxtaposition the edges of several plies of material lengthwise, independent means for infolding the so folded edges lengthwise and comprising a swinging foot, and means for swinging said foot.

7. In a sewing machine, the combination of means for folding together the edges of several plies of material, means for infolding the so folded edges and comprising a swinging foot, means for swinging said foot, and means for reciprocating said foot toward and from the needle.

8. In a sewing machine, the combination of means for simultaneously trimming the edges of several plies of material, means for folding together such trimmed edges, shiftable means for infolding the so folded edges and means for automatically shifting said shiftable means in a direction transverse to the line of travel of the work, thereby to effect the infolding of the edge.

9. In a sewing machine, the combination of means for trimming the edge of the work, means for folding such edge, means for infolding the so folded edge and comprising a movable member shiftable transversely of the line of travel of the work and also shiftable in the direction of the travel of the work toward and from the needle, and means for shifting said member.

10. In a sewing machine, the combination of means for simultaneously trimming the edges of several plies of material, means for folding together such trimmed edges, means for infolding the so folded edges and comprising a reciprocating and swinging foot, means for swinging said foot transversely of the line of travel of the material, and means for reciprocating it toward and from the needle.

11. In a sewing machine, the combination with a presser foot having a rising and falling movement, of means for folding together in juxtaposition the edges of several plies of material, and means for infolding the so folded edges and comprising a member supported for rising and falling movement with the presser foot and for movement in a line transverse to the line of movement of the presser foot.

12. In a sewing machine, the combination with a presser foot having a rising and falling movement, of means for simultaneously trimming the edges of several plies of material, means for folding together such trimmed edges, and means for infolding the so folded edges and comprising a member supported for rising and falling movement with the presser foot and for movement in a line transverse to the line of movement of the presser foot.

13. In a sewing machine, the combination with a presser foot having a rising and falling movement, of means for simultaneously trimming the edges of several plies of material, means for folding together such trimmed edges, means for infolding the so folded edges and comprising a member supported for swinging movement transversely of the line of travel of the material and also for reciprocatory movement toward and from the needle, and means for imparting such movements, said swinging member being also supported for rising and falling movement with the presser foot.

14. In a sewing machine having a presser foot, the combination of means for folding the edges of several plies of material over such presser foot, means for infolding such folded edges and supported for movement in two transverse planes, and means for actuating said infolding means.

15. In a sewing machine having a presser foot, the combination of means for folding the edges of several plies of material over such presser foot, and means for infolding such folded edges and comprising a movable member and means for actuating it transversely of the line of travel of the material.

16. In a sewing machine having a presser foot, the combination of means for folding the edge of a piece of work over such presser foot, means for infolding such folded edge and comprising a movable member, and means for actuating it transversely of the line of travel of the work and for reciprocating it toward and from the needle.

17. In a sewing machine having a presser foot provided with a chamber, the combination of means for folding the edge of a piece of work over such presser foot, means movable in said chamber for infolding such folded edge and means for actuating said infolding means.

18. In a sewing machine having a presser foot provided with a chamber, the combination of means for folding the edge of a piece of work over such presser foot, means movable in said chamber for infolding such folded edge, means for actuating said infolding means and means located in said chamber and coöperating with said means for insuring the proper folding of the work.

19. In a sewing machine having a presser foot provided with a chamber, the combination of means for folding the edge of a piece of work over such presser foot, means movable in said chamber for infolding such folded edge, means for actuating said infolding means and means located in said chamber and coöperating with said means for insuring the proper folding of the work and comprising a member extending longitudinally of the chamber.

20. In a sewing machine having a presser foot, the combination of means for folding together the edges of several plies of material over such presser foot, means for infolding the so folded edges and comprising a swinging member, and means for swinging said member.

21. In a sewing machine having a presser foot, the combination of means for folding the edge of a piece of work over such presser foot, means for infolding the so folded edge and comprising a swinging foot, means for swinging said foot, and means for reciprocating said foot toward and from the needle.

22. In a sewing machine having a presser foot, the combination of means for folding the edge of a piece of work over such presser foot, means for infolding the so folded edge and comprising a swinging foot, means for swinging said foot, means for reciprocating said foot toward and from the needle, and means for engaging and pushing the material intermediate the two foldings thereof.

23. In a sewing machine having a presser foot, the combination of means for folding the edge of a piece of work over such presser foot, means for infolding the so folded edge and comprising a swinging foot, means for swinging said foot, means for reciprocating said foot toward and from the needle, and means for clamping the material.

24. In a sewing machine having a presser foot, the combination of means for folding the edge of a piece of work over such presser foot, means for infolding the so folded edge and comprising a swinging foot, means for swinging said foot, means for reciprocating said foot toward and from the needle, means for engaging and pushing the material intermediate the two foldings thereof, and means for clamping the material subsequent to the pushing thereof.

25. In a sewing machine having a presser foot, the combination of means for folding the edge of a piece of work over such presser foot, means for infolding the so folded edge and comprising a movable foot, means for reciprocating said foot toward and from the needle, means for shifting said foot transversely of the line of travel of the work, means for engaging and pushing the work intermediate the two foldings thereof, and means for clamping the work subsequent to the pushing thereof.

26. In a sewing machine, the combination of a presser foot, means for trimming the edge of the material to be stitched, means for folding the so trimmed edge over the presser foot, means for pushing the material after it is folded, means for clamping it on the presser foot, and means for infolding the previously folded edge.

27. In a sewing machine, the combination of a presser foot, means for trimming the edge of the material to be stitched, means for folding the so trimmed edge over the presser foot, means for pushing the material after it is folded, means for clamping it on the presser foot, means for infolding the previously folded edge and comprising a swinging and reciprocatory foot, means for swinging it, and means for reciprocating it.

28. In a sewing machine, the combination of a presser foot having a chamber therein and a guide member extending longitudinally thereof and also having a recess at the forward portion thereof, means located within said recess for trimming the edge of the material to be stitched, means for folding the so trimmed edge over the presser foot, means for pushing the material after it is folded, means for clamping it on the presser foot, a swinging and reciprocatory foot working in said chamber and coöperating with said longitudinally extending guide member for infolding the previously folded edge, and means for swinging and reciprocating said foot.

29. In a sewing machine, the combination of a rising and falling presser foot having a chamber therein, a guide member extending longitudinally thereof and also having a recess at the forward portion thereof, means located within said recess for trimming the edge of the material to be stitched, means for folding the so trimmed edge over the presser foot, means for pushing the material after it is folded, means for clamping it on the presser foot, a swinging and reciprocatory foot working in said chamber and supported for rising and falling movement with the presser foot and coöperating with said longitudinally extending guide member for infolding the previously folded edge, and means for swinging and reciprocating said foot.

30. In a sewing machine, the combination of a throat plate, a presser foot having a chamber therein, a guide member extending longitudinally thereof and also having a recess at the forward portion thereof, means located within said recess for trimming the edge of the material to be stitched, means carried by the throat plate for folding the so trimmed edge over the presser foot, means for pushing the material after it is folded, means for clamping it on the presser foot, a swinging and reciprocatory foot working in said chamber and coöperating with said longitudinally extending guide member for infolding the previously folded edge, and means for swinging and reciprocating said foot.

31. In a sewing machine, the combination of a presser foot having a chamber therein and a guide member extending longitudinally thereof and also having a recess at the forward portion thereof, means located within said recess for trimming the edge of the material to be stitched, means supported independently of the presser foot for folding the so trimmed edge over the presser foot, means for pushing the material after it is folded, means for clamping it on the presser foot, a swinging and reciprocatory foot working in said chamber and coöperating with said longitudinally extending guide member for infolding the previously folded edge, and means for swinging and reciprocating said foot.

32. In a sewing machine having stitching mechanism and feeding mechanism, the combination of means for folding the edge of a piece of work, means for infolding the so folded edge and comprising a movable member, means for shifting it transversely of the line of travel of the work, and means carried by the feeding mechanism and projecting above the same and coöperating with said movable member.

33. In a sewing machine having stitching mechanism and feeding mechanism, the combination of means for folding the edge of a piece of work, means for infolding the so folded edge and comprising a movable member, means for shifting it transversely of the line of travel of the work, means carried by the feeding mechanism and projecting above the same and coöperating with said movable member, and means for reciprocating said movable member toward and from the needle, the movement thereof toward the needle being coincident with the movement of the feeding mechanism to feed the work.

34. In a sewing machine having stitching mechanism and feding mechanism and a rising and falling presser foot, the combination of means for trimming the edge of the material to be stitched, means for folding the so trimmed edge over the presser foot, means for pushing the material after it is folded, means for clamping it on the presser foot, means for infolding the previously folded edge and comprising a swinging foot supported for rising and falling movement with the presser foot, means for swinging said foot transversely of the line of travel of the work, means for reciprocating it toward and from the needle, a work guide carried by the presser foot and coöperating with said swinging foot, and an upwardly extending projection carried by the feeding mechanism and coöperating with said swinging foot.

35. In a sewing machine, the combination of means for folding the edge of a piece of work, additional means for thereafter pushing the folded edge transversely of the line of travel of the work, and automatically movable means for again and thereafter folding the so-folded edge.

36. In a sewing machine, the combination of means for folding in one direction the edge of a piece of work, additional means for thereafter pushing the folded edge transversely of the line of travel of the work, and automatically movable means for thereafter folding the so folded edge in an opposite direction.

37. In a sewing machine the combination of means for foldng in one direction the edge of a piece of work, and independent and automatically movable means movable transversely of the direction of travel of the work for folding the said folded edge in an opposite direction and upon itself, and means for actuating said movable means.

38. In a sewing machine the combination of means for folding in one direction the edge of a piece of work, independent and automatically swinging means movable transversely of the direction of travel of the work for folding said folded edge in the opposite direction and upon itself, and means for actuating said swinging means.

39. In a sewing machine the combination of means for trimming the edge of the material to be stitched, means for folding in one direction the so trimmed edge, and automatically movable means for folding in the opposite direction the previously folded edge.

40. In a sewing machine having a needle actuating lever, the combination of means for folding the edge of a piece of work, means actuated by said needle actuating lever for pushing the folded edge transversely of the line of travel of the work, and means for infolding the folded edge.

41. In a sewing machine having a needle actuating lever, the combination of means for folding the edge of a piece of work, means actuated by said needle actuating lever for pushing the folded edge transversely of the line of travel of the work, means for infolding the folded edge, and means for clamping the folded edge.

42. In a sewing machine the combination of means for trimming the edge of the material to be stitched, means for folding in one direction the so trimmed edge, means for folding in the opposite direction the previously folded edge, and automatically movable means for pushing the work intermediate the foldings thereof in a direction opposite to the direction in which it is folded at one time.

43. In a sewing machine having a presser foot, the combination of means for folding the edge of a piece of work thereover, means above a portion of the presser-foot for pushing the folded edge further on to the presser foot and comprising a reciprocatory member, and means for actuating it.

44. In a sewing machine having a presser foot, the combination of means for folding the edge of a piece of work thereover, means above a portion of the presser-foot for pushing the folded edge further on to the presser foot and comprising a reciprocatory member, means for actuating it, and means for infolding the folded edge.

45. In a sewing machine, the combination of a presser foot, means for folding the edge of a piece of work thereover, and means above a portion of the presser-foot for clamping the work on said presser foot and comprising a member having a rising and falling movement.

46. In a sewing machine, the combination of a presser foot, means for folding the edge of a piece of work thereover, and means for clamping the work on said presser foot and comprising a member having a rising and falling movement and provided with a channel-shaped portion.

47. In a sewing machine, the combination of a presser foot, means for folding the edge of a piece of work thereover, means for clamping the work on said presser foot and comprising a member having a rising and falling movement and provided with a channel-shaped portion, and means for infolding the folded edge.

48. In a sewing machine having a presser foot, the combination of means for folding the edge of a piece of work thereover, means for pushing the folded edge further on to the presser foot, and means operated through the instrumentality of said pushing means for clamping the work on said presser foot.

49. In a sewing machine having a presser foot, the combination of means for folding the edge of a piece of work thereover, means for pushing the folded edge further on to the presser foot, means operated through the instrumentality of said pushing means for clamping the work on said presser foot, and means for infolding the folded edge.

50. In a sewing machine having a presser foot and a needle actuating lever, the combination of means for folding the edge of a piece of work over said presser foot, means operated by said needle actuating lever for pushing the folded edge further on to said presser foot, and means actuated by a movable part of the machine, for clamping said work.

51. In a sewing machine having a presser foot and a needle actuating lever, the combination of means for folding the edge of a piece of work over said presser foot, means operated by said needle actuating lever for pushing the folded edge further on to said presser foot, and means actuated through the instrumentality of the pushing means for clamping said work on the presser foot.

52. In a sewing machine having a presser foot and a needle actuating lever, the combination of means for folding the edge of a piece of work over said presser foot, means operated by said needle actuating lever for pushing the folded edge further on to said presser foot, means actuated by a movable part of the machine for clamping said work, and means for infolding the folded edge.

53. In a sewing machine having a presser foot and a needle actuating lever, the combination of means for folding the edge of a piece of work over said presser foot, means operated by said needle actuating lever for pushing the folded edge further on to said presser foot, means actuated by a movable part of the machine for clamping said work, means for infolding the folded edge and comprising a swinging foot movable transversely of the line of travel of the work and also movable toward and from the needle, and means for shifting it.

54. In a sewing machine the combination of a presser foot, and a supplemental clamping member working on top thereof and comprising a bar and a resiliently supported channel shaped portion projecting therefrom and detachable from said bar.

55. In a sewing machine the combination of a presser foot, means for folding the edge of the work in one direction, a supplemental clamping member working on top of said presser foot, and means for folding the folded edge in the opposite direction.

56. In a sewing machine the combination of means for folding the work in one direction, means for clamping the so folded edge, and means independent of said first means for folding the folded edge in the opposite direction.

Signed at Nyack, N. Y., this 9th day of April, 1912.

ROBERT R. HUGHES, Jr.

Witnesses:
JOHN P. WEIS,
JOHN W. KANE.